United States Patent [19]

Elmer et al.

[11] Patent Number: 5,248,638

[45] Date of Patent: Sep. 28, 1993

[54] YELLOW HIGH SILICA GLASS

[75] Inventors: Thomas H. Elmer; Sheryl L. Hultman, both of Corning, N.Y.

[73] Assignee: Corning Incorporated, Corning, N.Y.

[21] Appl. No.: 863,002

[22] Filed: Apr. 6, 1992

[51] Int. Cl.⁵ .......................... C03C 3/04; C03C 14/00; C03C 11/00

[52] U.S. Cl. ......................................... 501/54; 501/32; 501/39

[58] Field of Search ............................ 501/54, 32, 39

[56] References Cited

U.S. PATENT DOCUMENTS

| | | | |
|---|---|---|---|
| 2,215,039 | 9/1940 | Hood et al. | 49/79 |
| 2,286,275 | 6/1942 | Hood et al. | 49/79 |
| 2,303,756 | 12/1942 | Nordberg et al. | 49/92 |
| 2,340,013 | 1/1944 | Nordberg et al. | 49/79 |
| 2,355,746 | 8/1944 | Nordberg et al. | 49/79 |
| 2,965,503 | 12/1960 | Hagedorn et al. | 106/52 |
| 3,188,217 | 6/1965 | Elmer et al. | 106/52 |
| 3,188,218 | 6/1965 | Elmer et al. | 106/52 |
| 3,258,631 | 6/1966 | Elmer et al. | 313/112 |
| 3,399,043 | 8/1968 | Elmer et al. | 55/30 |
| 4,073,579 | 2/1978 | Deeg et al. | 351/169 |

OTHER PUBLICATIONS

"Colored Glasses" by W. A. Weyl, (1959); Chapter IX and pp. 213 and 233.

Primary Examiner—mark L. Bell
Assistant Examiner—David R. Sample
Attorney, Agent, or Firm—Milton M. Peterson

[57] ABSTRACT

A yellow color by transmitted light is produced in a high silica glass by impregnating a porous, high silica glass with a solution of chromium and zinc salts and consolidating the glass under oxidizing conditions to dope the glass with chromium and zinc oxides, the chromium being predominantly in the hexavalent state. Optionally, an aluminum salt is included in the impregnating solution. The glass has particular utility as a filter for lighting purposes.

13 Claims, 1 Drawing Sheet

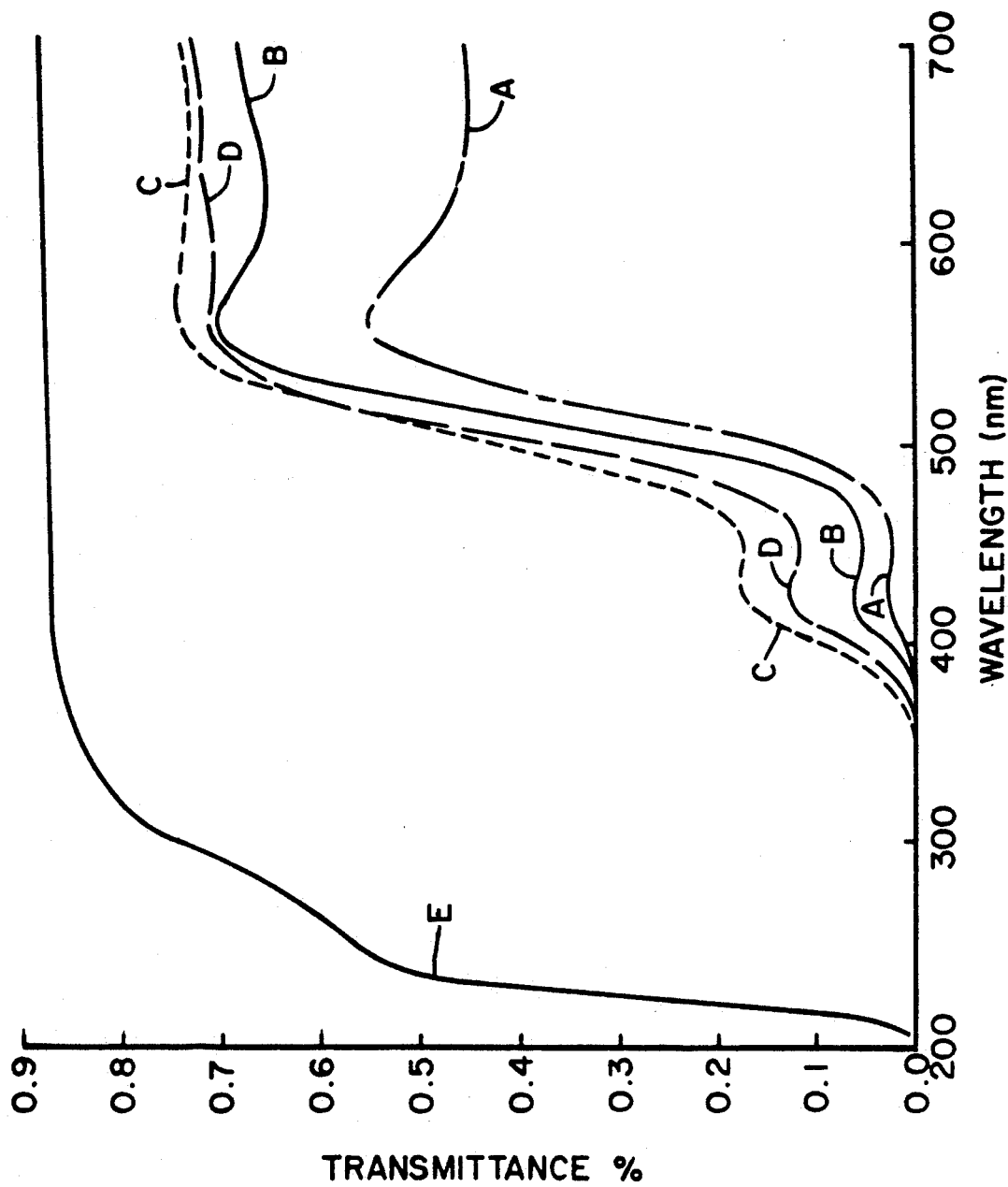

YELLOW HIGH SILICA GLASS

FIELD OF THE INVENTION

The field is light filters and doped, high silica glasses for production of such filters.

BACKGROUND OF THE INVENTION

High silica glasses are glasses consolidated from a porous state and containing, exclusive of additives, over about 94% silica. Such glasses are also referred to as reconstructed and 96% silica glasses. They are similar to fused silica in their ability to resist softening at high temperatures. Of particular interest, high silica glasses have coefficients of thermal expansion (CTEs) on the order of $7-14 \times 10^{-7}/°$ C. This property renders them resistant to heat shock.

Production of such glasses was first disclosed in U.S. Pat. Nos. 2,215,039 and 2,286,275 (Hood et al.). As there described, such glasses are melted as a precursor, phase-separable, borosilicate glass. This glass is then heat treated to separate the glass into a silica-rich matrix phase and a borate-rich second phase. The latter phase is readily soluble, and may be removed by solution in a mineral acid such as nitric acid. The porous glass matrix that remains is largely silica. It may then be thermally consolidated to produce a non-porous, clear glass of lesser volume and having a silica content of at least 94%.

It was subsequently learned that porous, high silica glasses could be impregnated with solutions containing a variety of different metal salts. These salts convert to oxides during consolidation and produce a modified glass. The production of colored glasses in this manner is taught in U.S. Pat. Nos. 2,303,756, 2,340,013 and 2,355,746 (Nordberg et al.). Among the colors reported is a yellowish-green obtained with a chromium oxide addition.

Recently, it has become desirable to provide a glass having a controlled yellow color for external automotive lighting. With the advent of halide lamps, glasses used in lamp envelopes have been subjected to greatly increased service temperatures. The ordinary lamp glasses heretofore used may soften at these temperatures. This has led to an interest in high silica glasses for use in such lamps, and more particularly to a high silica glass capable of exhibiting a prescribed yellow color.

Accordingly, it is a basic purpose of the present invention to provide high silica glasses that meet such needs. Another purpose is to provide a reliable method of developing the desired color in a high silica glass.

SUMMARY OF THE INVENTION

One aspect of our invention is a high silica glass that exhibits a yellow color by transmitted light, that contains, as essential additives, oxides of chromium and zinc, and wherein the chromium is predominantly present in the hexavalent state. The oxides of chromium and zinc are present in amounts of, as calculated on an oxide basis, 0.024–0.5% $Cr_2O_3$ and 0.034–1.0% ZnO. Preferably, the glass also contains 0.034–1.0% $Al_2O_3$ as a clearing agent.

The invention further resides in a light transmitting filter formed from a high silica glass with at least a portion of the glass containing, as essential additives, oxides of chromium and zinc, the filter exhibiting a yellow color by transmitted light and having a light transmission peak at or above 560 nm. In one embodiment, the filter is a tubular or hollow body having a wall thickness of 1.0–1.5 mm, an interior section that is essentially free of additives, and an exterior section containing, as additives, oxides of chromium and zinc, and preferably also aluminum.

The invention further contemplates a method of producing such colored, high silica glasses wherein a porous, high silica glass is impregnated with a solution of additive oxide precursors and the impregnated, porous glass is thermally consolidated into a solid, impervious glass. The method is characterized by impregnating the porous glass with a solution containing oxide precursors in amounts equivalent to at least 0.095% $Cr_2O_3$, at least 0.136% ZnO and at least 0.136% $Al_2O_3$ in 100 ml of solution. Preferably, metal nitrate salts in a nitric acid solution are used, and the impregnated glass is consolidated in an oxidizing atmosphere which may be a stream of flowing oxygen.

BRIEF DESCRIPTION OF THE DRAWING

The single FIGURE in the accompanying drawing is a graphical representation of light transmission values for different high silica glasses at wavelengths across the visible spectrum.

PRIOR ART

The most relevant art known to Applicants has been noted in the BACKGROUND section. The following United States Patents and literature, considered to be less relevant, are cited as being of possible interest:

U.S. Pat. No. 2,965,503 (Hagedorn) produces a yellow color in alkali silicate glasses with a combination of nickel, iron and titanium oxides.

U.S. Pat. No. 3,188,217 (Elmer et al.) produces an amber-colored, color-correcting filter by incorporating a combination of iron, nickel and aluminum oxides in a high silica glass.

U.S. Pat. No. 3,188,218 (Elmer et al.) produces a blue, color-correcting filter by incorporating a combination of $Co_2O_3$, $P_2O_5$ and an alkali metal oxide in a high silica glass.

U.S. Pat. No. 4,073,579 (Deeg et al.) produces porous surface layers on ophthalmic lenses and impregnates them with various colorants to produce tinted lenses. No association of color and colorant is made.

U.S. Pat. No. 3,258,631 and U.S. Pat. No. 3,399,043 (Elmer et al.) describe selectively impregnating porous glass tubing from the outside or external surface only.

Chapter IX of the text "Coloured Glasses", by W. A. Weyl, (1959) discusses studies on chromium and chromates in solutions and glasses; also pages 213 and 233 of the text describe the effect of titanium on uranium and on cerium to produce yellow colors.

DESCRIPTION OF THE INVENTION

As noted earlier, the Nordberg et al. patents teach that impregnation of a porous silica glass with a chromium salt, followed by consolidation, imparts a yellowish-green color to the glass. The present invention arose from an observation that, on occasion, the yellowish green shifted toward a true yellow. However, this did not occur consistently. This led to studies directed at determining the conditions necessary to consistently and reliably produce a true yellow color.

Our studies show that having the chromium in a predominantly hexavalent state in a high silica glass is a key to obtaining a pure yellow color by transmitted light. The presence of chromium in lower valence states favors a green color. Consequently, the yellowish-green color, heretofore observed, is indicative of a mixture of hexavalent and lower valence states of chromium. It appears that chromium need not be totally in the hexavalent state to obtain a pure yellow color. However, the hexavalent state must strongly predominate over the lower trivalent state which favors a green color.

The chromium ion may be introduced into a porous glass with a solution of any chromium salt, e.g. the chloride, sulfate, or nitrate, or the oxide. However, obtaining hexavalent chromium generally requires strong oxidizing conditions. Therefore, we have found it desirable to use a nitrate salt, chromium nitrate nonahydrate, in a weak nitric acid solution for impregnation purposes. This favors a highly oxidized state during consolidation.

We have also found it desirable to employ an oxidizing atmosphere during consolidation of a porous glass impregnated with a chromium salt. To this end then, we employ a flow-through heating chamber, for example, a tube furnace, for consolidation. There should be a continuous stream of dry oxygen flowing through the furnace.

A tendency for impregnated glasses to devitrify during consolidation was noted on occasion. It was found that this could be countered by including a zinc salt, preferably a nitrate salt such as zinc nitrate hexahydrate. It is believed that this effect of zinc results from zinc oxide forming a spinel, $ZnO.Cr_2O_3$. This stabilizes any chromium that does not go into solution in the glass.

It was observed in the original Nordberg et al. patents that there is a tendency for impregnated glasses to opacify when larger concentrations of impregnating salts are employed. It was found that this tendency could be countered by including an aluminum salt, for example an aluminum nitrate, in the impregnating solution to act as a clearing agent.

The presence of zinc oxide in the consolidated glass tends to increase transmittance at both the blue and red ends of the spectrum. It also tends to stabilize the transmittance above about 560 nm, whereas transmittance tends to diminish sharply when a glass is doped with chromium alone, or in conjunction with aluminum. Alumina tends to depress transmittance in the blue end and to shift the cutoff toward the red. An incidental benefit of the present glasses is strong absorption in the near ultra-violet portion of the spectrum, that is below 400 nm.

A porous, high silica glass, suitable for impregnation purposes, may be prepared by a technique in accordance with the procedure generally described in U.S. Pat. No. 2,303,756. That procedure involves the production of a parent glass article in a conventional manner from a selected borosilicate glass. The article is then thermally treated to separate the glass into two phases, one of which is composed essentially of soluble constituents. The article is then leached with a dilute mineral acid. This removes the soluble phase and leaves a porous, high silica structure retaining its original shape. The porous, high silica structure is rinsed and impregnated with a solution of the desired salts. The impregnated structure is then dried and heat treated to convert the salts to oxides, close the pores and consolidate the glass.

The impregnation step may be accomplished by immersing the porous glass article in a $0.1N$ $HNO_3$ solution containing salts of the desired oxides in suitable concentration. It may be carried out directly after rinsing, this being termed "wet" impregnation. Alternatively, impregnation may occur after the rinsed, porous glass has been dried, this being termed "dry" impregnation. The immersion time may vary according to the concentration of salts in the solution; the greater the concentration of salts in the solution, the shorter the immersion time. The immersion time may also vary according to whether a "wet" or "dry" impregnation process is employed. If a "wet" impregnation is employed, a much greater immersion time must be allowed to obtain a given concentration of additives within the glass than is the case if a "dry" impregnation is employed. This is due to the fact that, in a "wet" impregnation, the additives enter the pores by the slow process of diffusion, whereas, in a "dry" impregnation, the additives are brought into the pores by means of capillary action. While the "wet" method is slower, it does allow better control of the impregnation. However, either method may be employed.

The invention is further described with respect to our preferred mode of operation. In this procedure, a combination of chromium, zinc and aluminum nitrate salts is dissolved in $0.1N$ nitric acid to provide an impregnating solution.

Initially, tubing samples were prepared for use in the impregnation process. These samples were two to eight inches in length and had an outer diameter of about 14.1 mm and a wall thickness of about 1.1 mm. It was observed that organic contamination interferes with the homogeneity and/or shade of yellow color. Such contamination was effectively eliminated by heating the tubing samples to 650° C. in air for about an hour, or until the glass appeared colorless.

Solutions were prepared and allowed to stand for no less than 15 minutes prior to use. The impregnating process was completed with samples and solutions at room temperature. "Dry" impregnation was generally conducted for two minutes. The intensity of the color decreased with shorter periods, and also tended toward a greenish cast when fired. Intensities increased only marginally with longer soak times up to about four minutes.

For the intended lamp application, only the exterior surface of the tubing was impregnated. This was desirable to avoid any adverse reaction on the inside surface due to the presence of glass colorant. The samples were washed for one minute in $0.1N$ $HNO_3$ to remove excess salt solution from the surface. Samples were then briefly rinsed with deionized water for a few seconds. Drying at room temperature helps to prevent migration of salts to the outer surface which can cause surface devitrification, crazing, or reboil upon consolidation.

Consolidation was performed by heating the dried tubing at a rate not to exceed 100° C./hour to 850° C., with a one-hour hold at 850° C. The temperature was then increased to about 1000° C. at a rate of 100° C./hour with another one-hour hold at 1000° C. These holds remove molecularly-bound water. Finally, the temperature was increased to about 1200° C. at 100° C./hour with a 30-minute hold at the peak temperature to allow for consolidation. The cooling rate used was the natural cooling rate of the furnace.

Another factor involved in the consolidation process is the oxygen flow rate. For a 45 mm ID furnace tube, the minimum flow rate required to allow adequate oxidation of the components that produce the yellow color was determined to be about 80 cc/minute. The maximum measured $O_2$ flow was about 250 cc/minute. However, oxygen was used at higher flow rates without adversely affecting the color of the consolidated ware.

In most cases, samples were removed from the furnace after the temperature dropped below 1000° C. The samples appeared uniformly round and without serious deformation. However, highly concentrated impregnation solutions tend to soften the glass during firing. This may lead to deformation.

Our studies have indicated that minimum amounts of each nitrate salt per 100 ml of 0.1N nitric acid solvent are required to yield the desired yellow color. These minima are 0.5 gram $Cr(NO_3)_3.9H_2O$, 0.5 gram $Zn(NO_3)_2.6H_2O$ and 1.0 gram $Al(NO_3)_3.9H_2O$. These minima are equivalent to about 0.095% $Cr_2O_3$ and about 0.136% each of ZnO and $Al_2O_3$ in the impregnating solution. In turn, they are equivalent, on a calculated oxide basis, to about 0.024% $Cr_2O_3$, 0.034% ZnO and 0.034% $Al_2O_3$ in the consolidated glass.

For automotive lamp applications, it is desirable to provide a peak in the light transmittance curve above 560 nm, preferably in the range of 570-580 nm, and to provide stable transmittance beyond the peak out to at least 700 nm. For an acceptable color intensity with a short impregnation time, we prefer to use impregnating solutions containing larger amounts of each salt with an impregnation time of two minutes. In particular, we employ solutions containing metal nitrate salts in concentrations by weight equivalent to 1-2% $Cr_2O_3$, 1.6-4% ZnO and 1.6-4% $Al_2O_3$. These are equivalent to about 0.25 to 0.50% $Cr_2O_3$, 0.4-1.0% ZnO and 0.4-1.0% $Al_2O_3$ in the consolidated glass. However, as shown later, the actual amount of nitrate salt, and consequent oxide, introduced into the porous glass is substantially lower.

In general, impregnating solutions containing the nitrate salts of chromium, zinc and aluminum in weight ratios of about 1:1:2 provide optimum glass quality, color intensity and hue. These ratios may be varied of course. The following guidelines indicate the effects that may be encountered when such variations are made:

1. Low levels or no zinc nitrate may cause the glass to craze and become greenish in color.
2. Low zinc and high aluminum levels may cause opacification and/or crazing.
3. High aluminum nitrate levels may decrease the intensity of the color; conversely, low aluminum nitrate levels may increase the intensity of the color.
4. Increasing the impregnation time, the salt concentration levels, or both, may intensify the color.
5. Increasing the color intensity decreases transmission in the visible region of the spectrum; conversely, decreasing the color intensity may increase transmission in the visible region of the spectrum.

The invention is further described with reference to the accompanying drawing. The single FIGURE is a graphical representation of light transmittance values recorded across the visible spectrum for four different, impregnated and consolidated, high silica glass samples; also an unimpregnated sample. The values were recorded by a Varian CARY 210 recording spectrophotometer. Transmittance in percent is plotted on the vertical axis. Wavelengths in nanometers (nm) are plotted on the horizontal axis.

The four samples were prepared in the manner described earlier. They differed only in the impregnating solutions employed in each case. In particular, metal nitrate salts were dissolved in 0.1N nitric acid for each solution. The TABLE below shows, under each metal symbol (Cr, Zn and Al), the amount, in grams, of the hydrated metal nitrate dissolved in 100 ml of acid. Sample E is the unimpregnated sample.

TABLE

| Sample | Cr | Zn | Al |
|--------|----|----|----|
| A | 3 | — | — |
| B | 3 | — | 6 |
| C | 3 | 3 | 6 |
| D | 3 | 3 | — |
| E | — | — | — |

In the graphical representation, the transmission curve for each test sample is identified by the letter designation of the TABLE above.

A series of experiments was carried out to illustrate the effect of two variables, time of impregnation and whether one or both sides of the tubing is impregnated. The impregnating solution was a 0.1 N $HNO_3$ solution containing 6 grams each of $Cr(NO_3)_3.9H_2O$ and $Zn(NO_3).6H_2O$ and 12 grams of $Al(NO_3).9H_2O$ in 100 ml of solution. The porous glass test pieces were lengths of 14.1 mm outside diameter tubing with a 1.1 mm wall.

The impregnating variables for the four experiments are shown in the TABLE below. Impregnating time is in minutes. The designations (O) and (O&I) indicate, respectively, impregnation of the outside only, and both sides, of the tubing samples. Following consolidation of the impregnated test pieces, the glasses were analyzed for the oxides of chromium, zinc and aluminum. The analyses, in weight percent, are also recorded in the TABLE.

TABLE

| Ex. | Time (min.) | Sides | $Cr_2O_3$ | ZnO | $Al_2O_3$ |
|-----|-------------|-------|-----------|-------|-----------|
| 1 | 2 | O | 0.100 | 0.136 | 0.392 |
| 2 | 2 | O&I | 0.181 | 0.269 | 0.513 |
| 3 | 10 | O&I | 0.199 | 0.306 | 0.560 |
| 4 | 1/6 | O | 0.051 | 0.076 | 0.325 |

Two conclusions may be drawn from these data. First, it appears that about 0.25% $Al_2O_3$ is introduced from a source other than the impregnating solutions, probably the porous glass. It further appears that the amount of salts introduced into the glass progressively increases with time; also, that the weight percent in the impregnating solutions is substantially greater than the amount introduced into the glass even with ten minute impregnation on both sides. Sample 1, for example, represents our preferred impregnating schedule for lamp tubing. The analyzed oxides in this sample represent about one-third of the calculated oxide contents in the solution. Also, a constant ratio of $Cr_2O_3$:ZnO:$Al_2O_3$, in weight percent, of about 2:3:3 is apparent.

We claim:

1. A glass consolidated from a porous state and containing, exclusive of additives over about 94% $SiO_2$, that exhibits a yellow color by transmitted light, that comprises, as additives, oxides of chromium and zinc in amounts up to 0.5% $Cr_2O_3$ and 1.0% ZnO, respectively, the chromium oxide content being sufficient to impart a yellow color to the glass by transmitted light and the zinc oxide content being sufficient to stabilize any chromium oxide undissolved in the glass, and wherein the chromium is predominantly present in the hexavalent state.

2. A glass in accordance with claim 1 wherein the oxides of chromium and zinc are present in amounts of, as calculated on an oxide basis, 0.024-0.5% $Cr_2O_3$ and 0.034-1.0% ZnO.

3. A glass in accordance with claim 1 wherein the glass additionally comprises $Al_2O_3$ in a sufficient amount to act as a clearing agent.

4. A glass in accordance with claim 3 wherein the $Al_2O_3$ content, as calculated on an oxide basis, is 0.034-1.0% $Al_2O_3$.

5. A glass in accordance with claim 1 wherein the glass exhibits a light transmittance peak at or above a wavelength of 560 nm.

6. A glass in accordance with claim 5 wherein the light transmittance is essentially stable at wavelengths between 560 and 700 nm.

7. A glass in accordance with claim 4 wherein the ratio, by analyzed weight percent, of the $Cr_2O_3$:ZnO:$Al_2O_3$ is about 2:3:3.

8. A high silica glass in accordance with claim 7 wherein the glass contains, as analyzed on an oxide basis, about 0.10% $Cr_2O_3$, 0.14% ZnO and 0.14% $Al_2O_3$.

9. A light transmitting filter formed from a glass consolidated form a porous state and containing, exclusive of additives, over about 94% $SiO_2$, at least a portion of the glass comprising as additives, oxides of chromium and zinc in amounts up to 0.5% $Cr_2O_3$ and 1.0% ZnO, respectively, the chromium oxide content being sufficient to impart a yellow color to the glass by transmitted light and the zinc oxide content being sufficient to stabilize any chromium oxide undissolved in the glass, the chromium being predominantly present in the hexavalent state, the filter, exhibiting a yellow color by transmitted light and having a light transmittance peak at or above a wavelength of 560 nm.

10. A light transmitting filter in accordance with claim 9 wherein the light transmittance is essentially stable at wavelengths between 560 and 700 nm.

11. A light transmitting filter in accordance with claim 9 wherein the glass additionally comprises the oxide of alumina, the oxides being present in amounts of, as calculated on an oxide basis, 0.024-0.5% $Cr_2O_3$, 0.034-1.0% ZnO and 0.034-1.0% $Al_2O_3$.

12. A light transmitting filter in accordance with claim 9 in the form of a tubular or hollow body having a wall thickness on the order of 1-1.5 mm, an interior section that is essentially free of additives and an exterior section containing, as additives, oxides of chromium, zinc and aluminum.

13. A light transmitting filter in accordance with claim 12 wherein the ratio, by analyzed weight percent, of $Cr_2O_3$:ZnO:$Al_2O_3$ in that portion of the glass containing additives is about 2:3:3.

* * * * *